(12) United States Patent
Hodges et al.

(10) Patent No.: US 10,574,020 B2
(45) Date of Patent: Feb. 25, 2020

(54) FIBER LASER PACKAGING

(71) Applicant: NLIGHT, INC., Vancouver, WA (US)

(72) Inventors: Aaron Ludwig Hodges, La Center, WA (US); Mitchell Ryan Reynolds, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 15/842,441

(22) Filed: Dec. 14, 2017

(65) Prior Publication Data

US 2018/0175577 A1    Jun. 21, 2018

Related U.S. Application Data

(60) Provisional application No. 62/434,898, filed on Dec. 15, 2016.

(51) Int. Cl.
    *H01S 3/067*      (2006.01)
    *H01S 3/04*      (2006.01)

(52) U.S. Cl.
    CPC ........ *H01S 3/06708* (2013.01); *H01S 3/0405* (2013.01); *H01S 3/0407* (2013.01)

(58) Field of Classification Search
    CPC .. H01S 3/0405; H01S 3/0407; H01S 3/06704; H01S 3/067–06795; G02B 6/36–366; G02B 6/3632; G02B 6/2934; G02B 6/3664; G02B 6/4266; G02B 6/08; G02B 6/44

See application file for complete search history.

(56) References Cited

U.S. PATENT DOCUMENTS

| | | | |
|---|---|---|---|
| 3,279,532 A | 10/1966 | Pfeil | |
| 4,724,316 A * | 2/1988 | Morton | ............. G01D 5/35345 250/227.14 |

(Continued)

FOREIGN PATENT DOCUMENTS

| | | |
|---|---|---|
| JP | 9145072 | 6/1998 |
| WO | 2016129447 | 8/2016 |

(Continued)

OTHER PUBLICATIONS

USPTO; International Search Report and Written Opinion for PCT/US16/62875; dated Feb. 2, 2017; 8 pages.

(Continued)

*Primary Examiner* — Joshua King
(74) *Attorney, Agent, or Firm* — Schwabe Williamson & Wyatt, P.C.

(57) ABSTRACT

A packaged fiber laser may include a wound fiber laser spiral including a metal ribbon having ends, surfaces, and edges; a fiber laser on a first one of the surfaces of the metal ribbon; and a metal sheet coupled to a first one of the edges of the metal ribbon or a second one of the surfaces of the metal ribbon. Packaging for a fiber laser may include a cooling plate coupled to a second one of the edges of the metal ribbon or the second surface of the metal ribbon, the cooling plate including: a casing including a cover, a bottom, and an outer sidewall; flow channels formed inside the casing, the flow channels defined by inner sidewalls of the cooling plate, wherein the cover is coupled to a top of the inner sidewalls to enclose the flow channel; and an inlet to deliver coolant to the flow channels.

21 Claims, 10 Drawing Sheets

(56) References Cited

U.S. PATENT DOCUMENTS

Figure 1A:
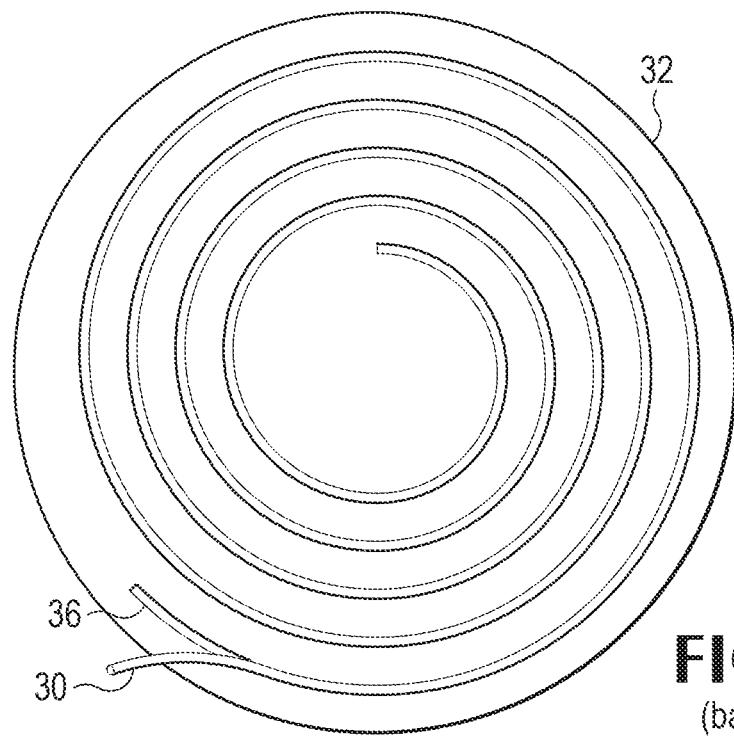

| | | | |
|---|---|---|---|
| 5,173,957 A | 12/1992 | Bergano | |
| 5,241,414 A | 8/1993 | Giles | |
| 5,333,230 A * | 7/1994 | Hata | G02B 6/4416 385/110 |
| 5,594,748 A | 1/1997 | Jabr | |
| 5,903,583 A | 5/1999 | Ullman | |
| 5,912,748 A | 6/1999 | Jander | |
| 6,442,312 B1 * | 8/2002 | Terao | G02B 6/02138 385/37 |
| 6,517,221 B1 | 2/2003 | Xie | |
| 6,583,926 B1 | 6/2003 | Wu | |
| 6,683,892 B1 * | 1/2004 | Yamaura | H01S 3/06704 359/341.1 |
| 8,493,651 B1 | 7/2013 | Hu et al. | |
| 8,971,359 B2 | 3/2015 | Creeden | |
| 9,285,125 B2 | 3/2016 | Lee | |
| 2002/0001320 A1 * | 1/2002 | Itoh | H01S 3/067 372/6 |
| 2005/0103472 A1 * | 5/2005 | Lofland | F28F 3/12 165/80.4 |
| 2005/0113068 A1 | 5/2005 | Hoffman | |
| 2006/0002080 A1 | 1/2006 | Leija | |
| 2006/0027356 A1 | 2/2006 | Sulzer | |
| 2006/0191838 A1 | 8/2006 | Lowell | |
| 2008/0198880 A1 | 8/2008 | Munroe et al. | |
| 2009/0060444 A1 * | 3/2009 | Muendel | G02B 6/3636 385/137 |
| 2009/0266105 A1 | 10/2009 | Viklund | |
| 2010/0074586 A1 * | 3/2010 | Panarello | G02B 6/4457 385/134 |
| 2010/0155040 A1 | 5/2010 | Hoffmann | |
| 2010/0247055 A1 * | 9/2010 | Arashitani | H01S 3/06704 385/137 |
| 2012/0103580 A1 | 5/2012 | Buttignol | |
| 2012/0301097 A1 | 11/2012 | Nakano | |
| 2014/0240818 A1 | 8/2014 | Taya | |
| 2014/0362876 A1 * | 12/2014 | Schwarzenbach | H01S 3/06733 372/6 |
| 2015/0159884 A1 | 6/2015 | Whang | |
| 2017/0149203 A1 | 5/2017 | Foley | |
| 2017/0170622 A1 | 6/2017 | Kashiwagi | |
| 2017/0329092 A1 | 11/2017 | Sanders | |
| 2018/0062347 A1 | 3/2018 | Hodges | |

FOREIGN PATENT DOCUMENTS

| | | |
|---|---|---|
| WO | 2017087865 | 5/2017 |
| WO | 2017197362 | 11/2017 |
| WO | 2018044813 | 3/2018 |
| WO | 2018112220 | 6/2018 |

OTHER PUBLICATIONS

USPTO; International Search Report and Written Opinion for PCT/US17/48955 dated Dec. 26, 2017; 14 pages.

European Patent Office, Rijswik; International Search Report and Written Opinion for PCT/US17/066453; dated May 15, 2018; 15 pages.

European Patent Office, International Search Report and Written Opinion in PCT/US2019/021692, dated Jul. 24, 2019, 12 pages.

* cited by examiner (background)

(background)

(background)

(background)

FIBER LASER PACKAGING

RELATED APPLICATIONS

This application is a non-provisional of U.S. provisional application 62/434,898, filed Dec. 15, 2016, all of which is incorporated by reference herein in its entirety.

TECHNICAL FIELD

The present disclosure relates to fiber laser packaging.

BACKGROUND

A fiber laser is a type of optical laser that includes a clad fiber rather than a rod, a slab, or a disk. Fiber lasers reflect light through an optical cavity such that a stream of photons stimulates atoms in a fiber that store and release light energy at useful wavelengths. Fiber type, core size, numerical aperture, refractive index, and doping of the fiber contribute to the range and possibilities of light propagation using fiber lasers. A fiber laser may include a core surrounded by a cladding and a protective coating. The core may have a different refractive index than the cladding. Depending on size, refractive index, and wavelength, the core may be single mode or multi-mode although single mode is preferred for many applications. The core may be made of a variety of materials including well-known silica-based materials. The core may include a dopant from the lanthanide series of chemicals including Erbium or Ytterbium that release light energy at useful wavelengths. A fiber laser may be illuminated by a light source, e.g., a laser diode. A light source may be a single diode, an array of diodes, or many separate pump diodes, each with a fiber going into a coupler. A fiber laser may be used in a variety of applications including welding heavy sheets of metal, cutting highstrength steel used to produce automobiles, cutting and drilling concrete, and microscale and nanoscale machining.

In some applications, a fiber laser may have a length between several millimeters and hundreds of meters, most commonly in the 1-30 meter range. A fiber laser may release heat during operation that requires efficient heat removal to avoid damaging core, cladding, or buffer material. Laser systems may necessitate cooling to improve performance, avoid malfunction, and extend product life. As the amount of laser power increases so does the need to remove larger amounts of heat from the laser system to avoid overheating components that may change their operating characteristics. An increase in temperature may result in an increase in laser wavelength and decrease on power that may compromise a laser system's performance. Since the laser wavelength increases and power decreases with an increase in temperature, the temperature must be uniform throughout the system's laser diode arrays to achieve high overall optical conversion efficiency. Laser diode reliability also decreases with increasing temperature, e.g., lifetime decreases by approximately half for every 10° C. increase in temperature in some instances.

Figure 1B:
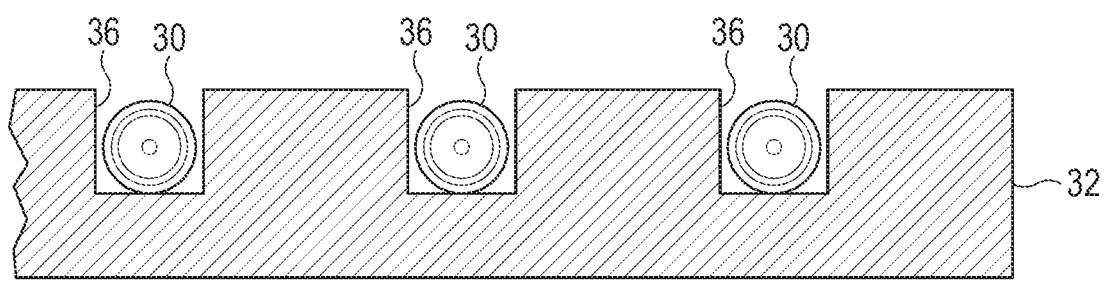
Figure 1C:
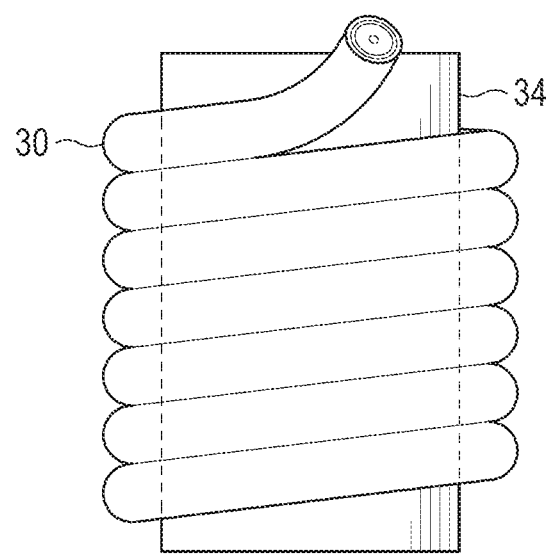

Referring to FIGS. 1A-C, a fiber laser 30 may be coiled into a coil and placed within grooves 36 of a plate 32. Plate 32 may be made of any material known to a person of ordinary skill in the art, e.g., metal, plastic, and the like. Grooves 36 may be machined into plate 32 in some examples. Grooves 36 may be sized to receive fiber laser 30, as shown in FIG. 1B. Fiber laser 30 may be coiled in a plane around grooves 36 of plate 32. Alternatively, as shown in FIG. 1C, fiber laser 30 may be coiled vertically around spool 34.

Figure 2:
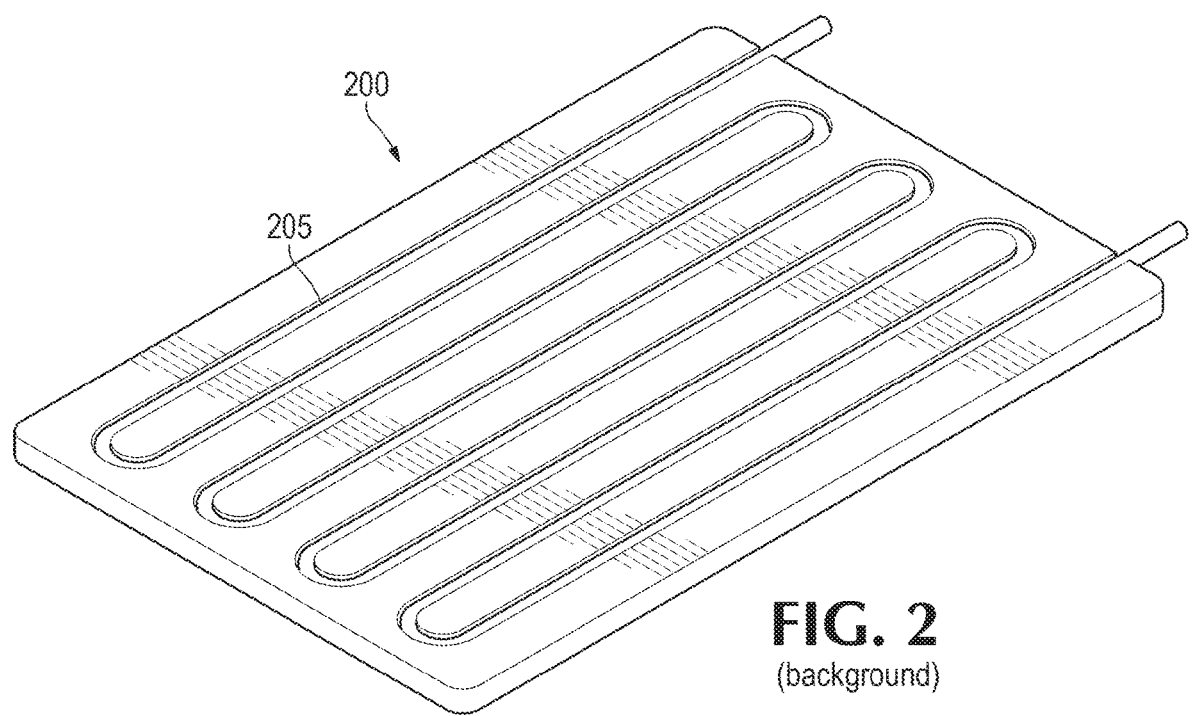

FIG. 2 diagrams a cooling plate 200 that may be used with the coiled fiber laser of FIG. 1. Cooling plate 200 may include a channel formed to receive a tubing 205. The channel may be formed on the cooling plate 200 in a continuous manner alternating from right to left to right to left (or up to down to up to down) as shown in FIG. 2. The channel may include straight portions connected by curved portions. The tubing 105 may have an inlet end and an outlet end that extend beyond an edge of cooling plate 200. A coolant may be fed into the inlet end to discharge from the outlet end.

Cooling plate 200 may include any thermally conductive material known to a person of ordinary skill in the art. However, a cooling plate 200 may be made from a different material than the tubing 205. For instance, the tubing 205 may be made from a first material having excellent thermal transfer capability, such as copper. However, the cooling plate 200 may be made from a second different material (such as aluminum) in order to enable inexpensive channel machining and/or for other reasons related to channel machining processes. The thermal transfer capability of the second different material may not be the same as the first material (e.g., may be lower), which may be an acceptable design tradeoffs for some applications to enable the inexpensive channel etching and/or for other reasons related to channel etching processes.

The cooling plate 100 may have a front face (illustrated) and a back face. In a laser system, a front face of the cooling plate 100 may be in contact with any surface of the plate 32 (FIG. 1A), e.g., the front surface (illustrated) of the plate 32, for dissipating released heat of the fiber laser in the grooves 36 of the plate 32. However, a need remains for more effective mechanisms than such a system to remove heat and cool laser systems.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

FIGS. 1A-C diagram a coiled fiber laser.

FIG. 2 diagrams a cooling plate that may be used with the coiled fiber laser of FIG. 1.

Figure 3:
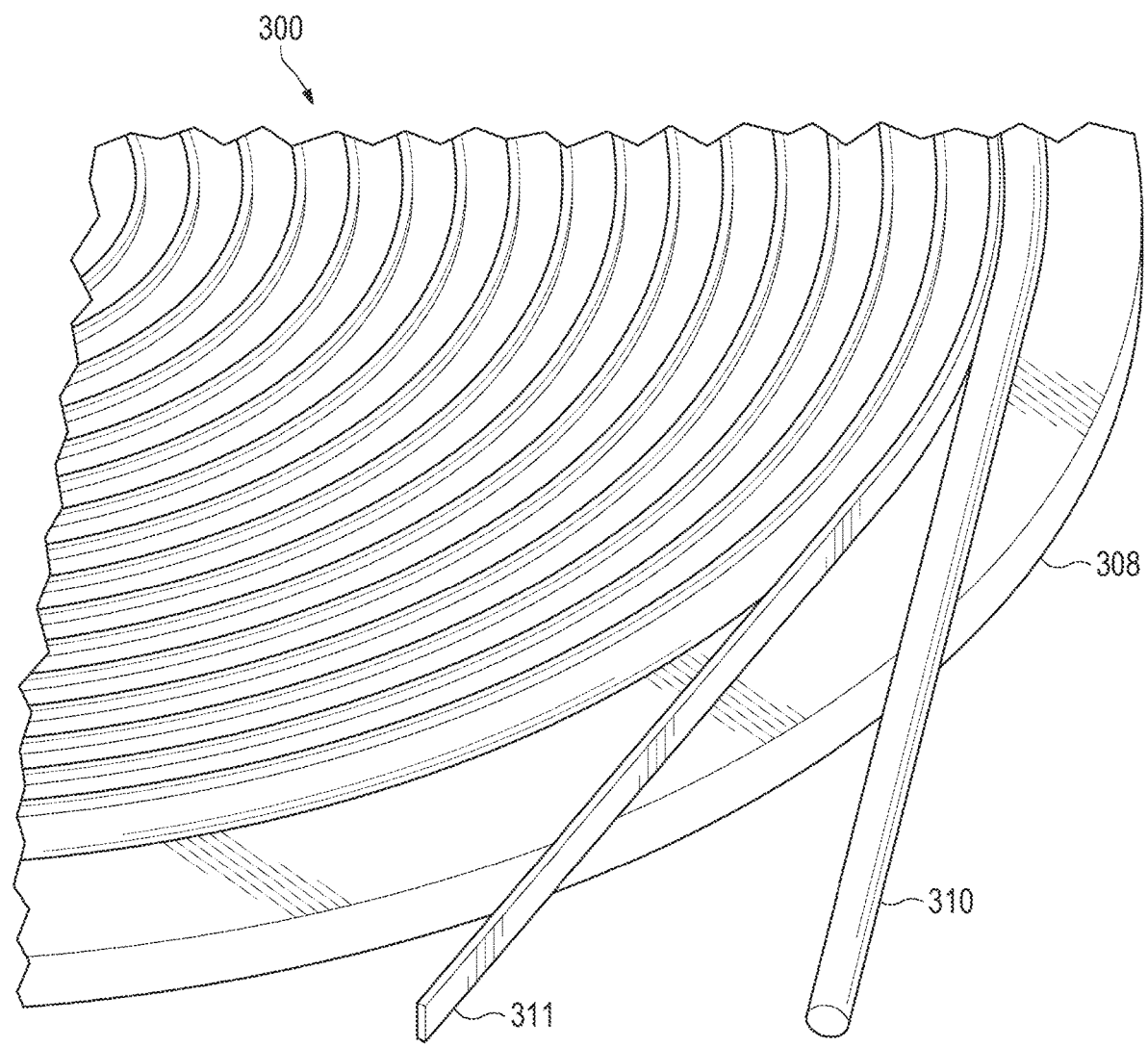

FIG. 3 diagrams a wound fiber laser spiral according to various embodiments.

Figure 4:
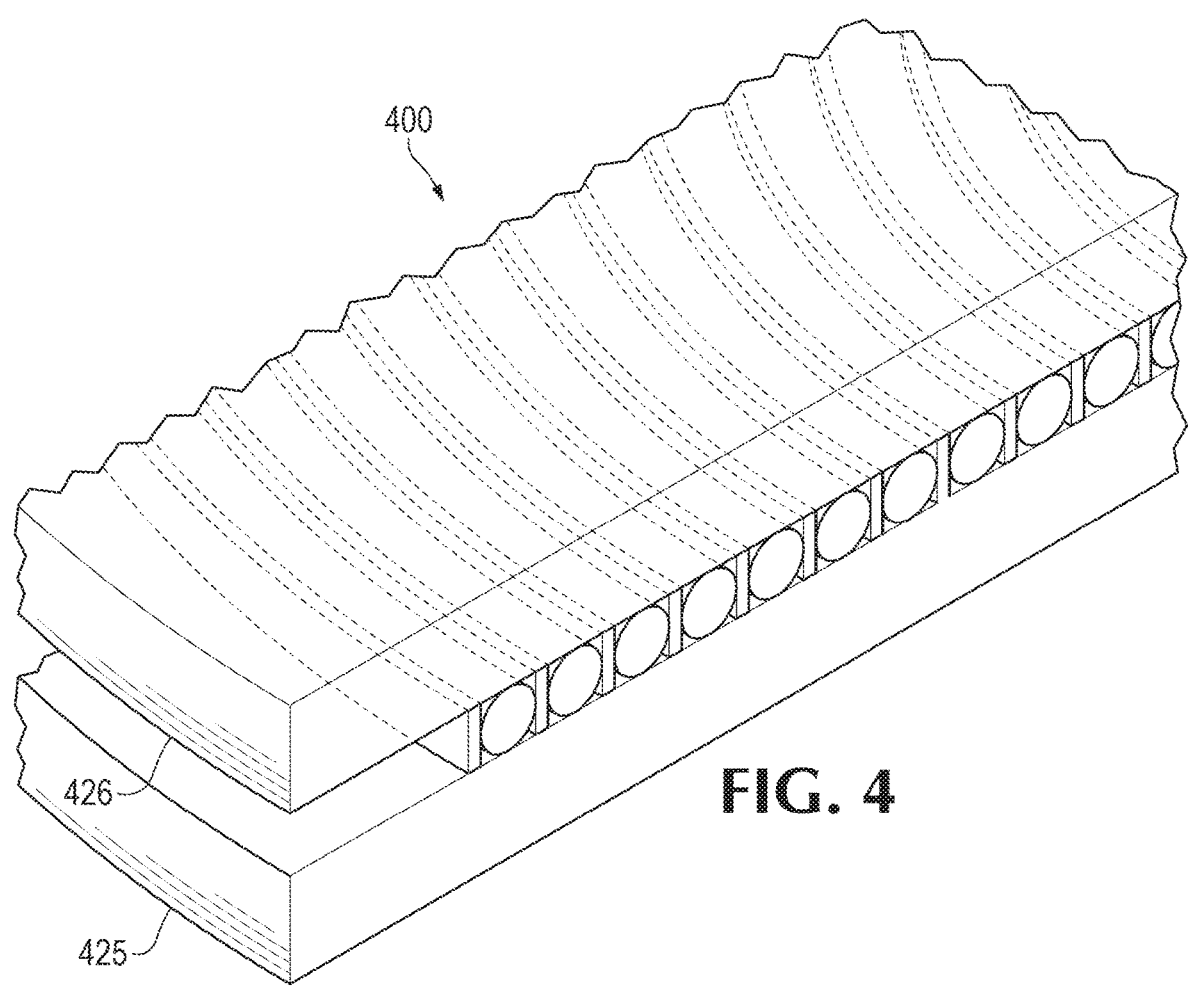

FIG. 4 diagrams another wound fiber laser spiral according to various embodiments.

Figure 5:
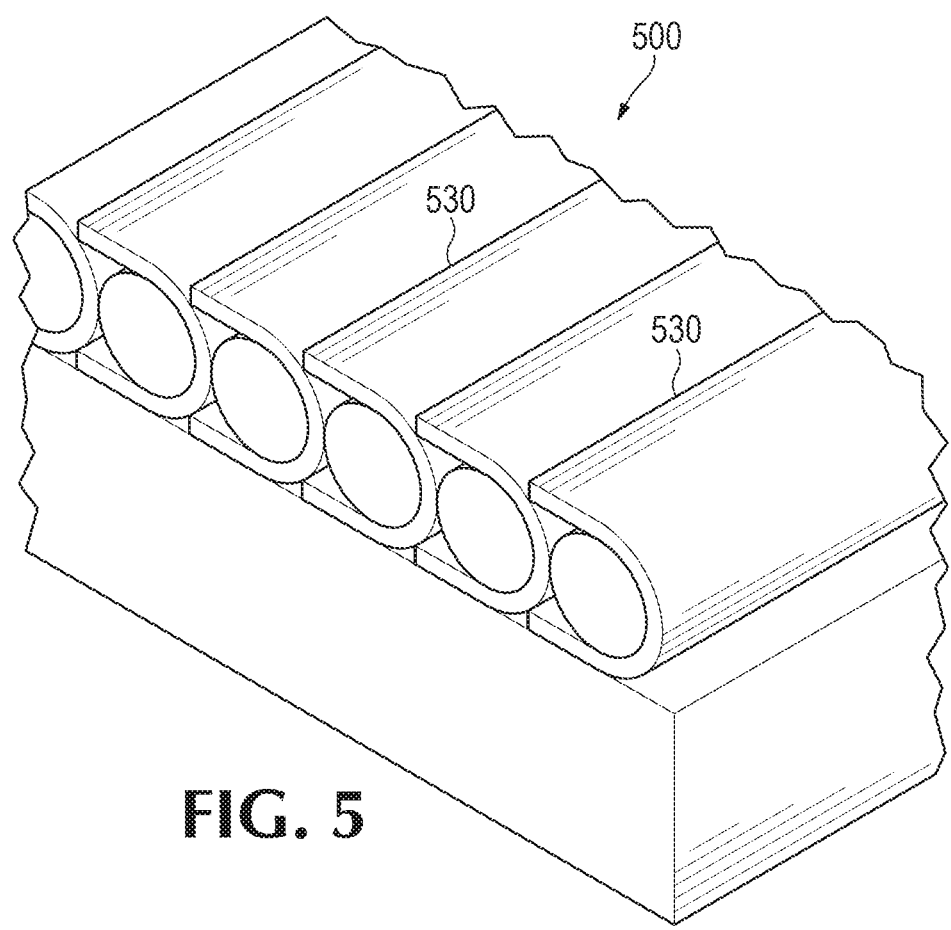

FIG. 5 diagrams a wound fiber laser spiral with interlocking according to various embodiments.

Figure 6:
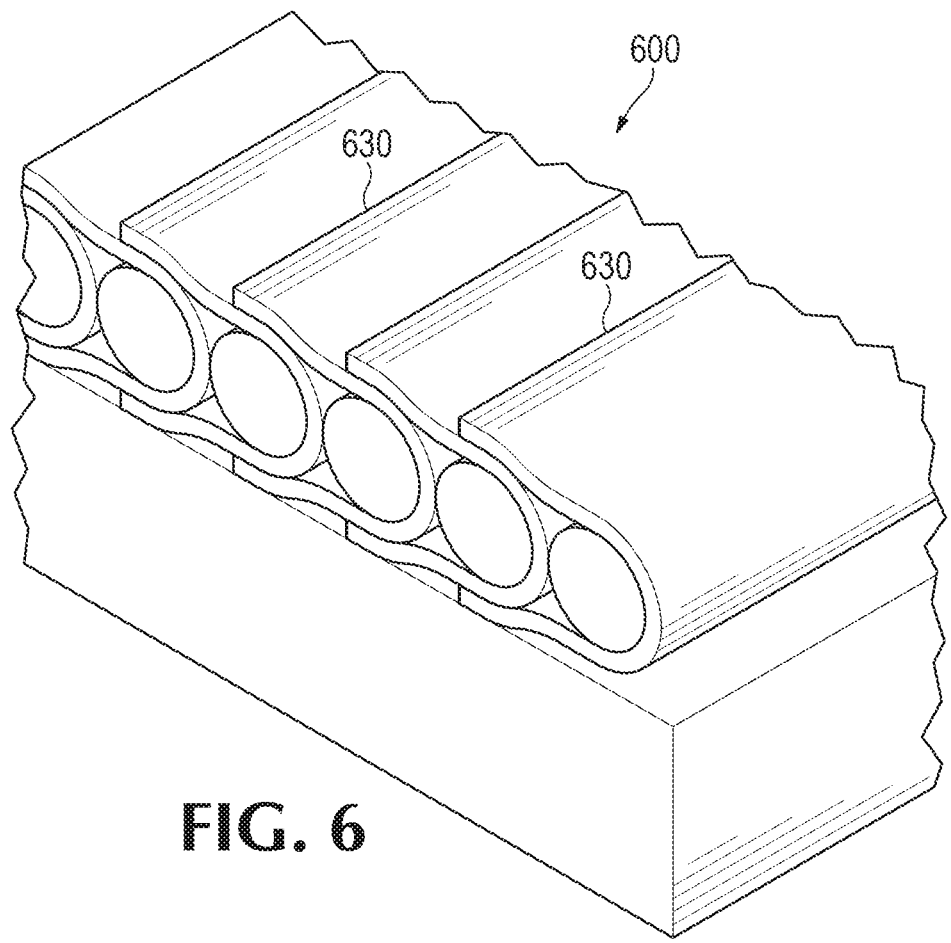

FIG. 6 diagrams another wound fiber laser spiral with interlocking according to various embodiments.

Figure 7:
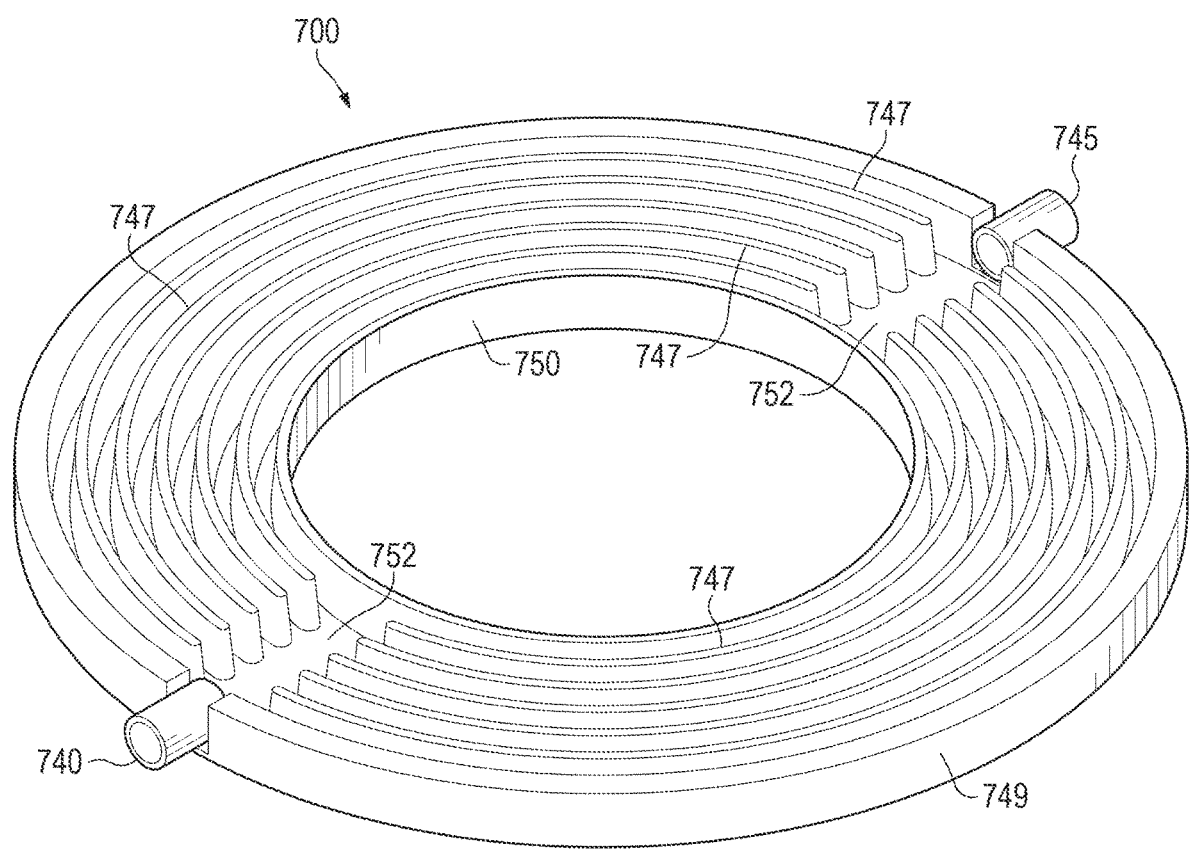

FIG. 7 diagrams an O-shaped cooling plate that may be used with fiber laser components, such as any of the wound fiber laser spirals described herein.

Figure 8:
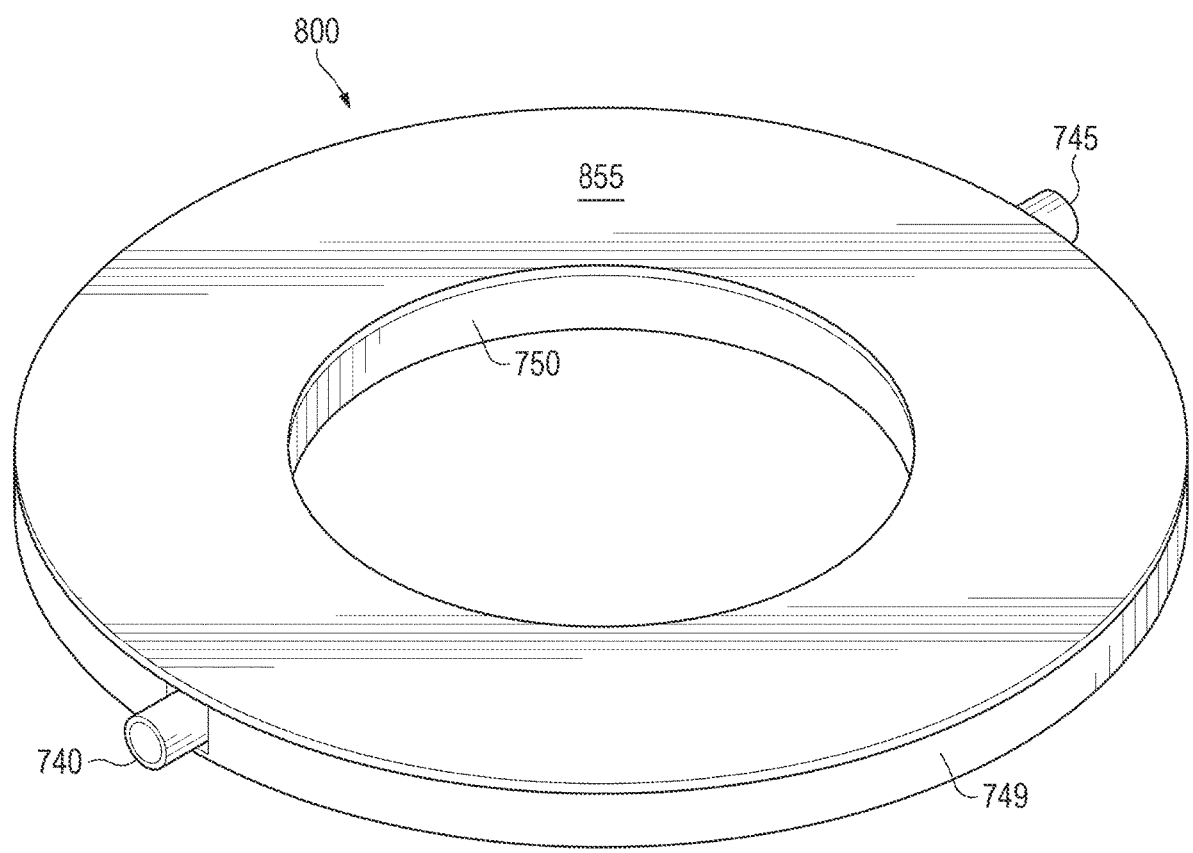

FIG. 8 diagrams the O-shaped cooling plate of FIG. 7 with an enclosing plate.

Figure 9:
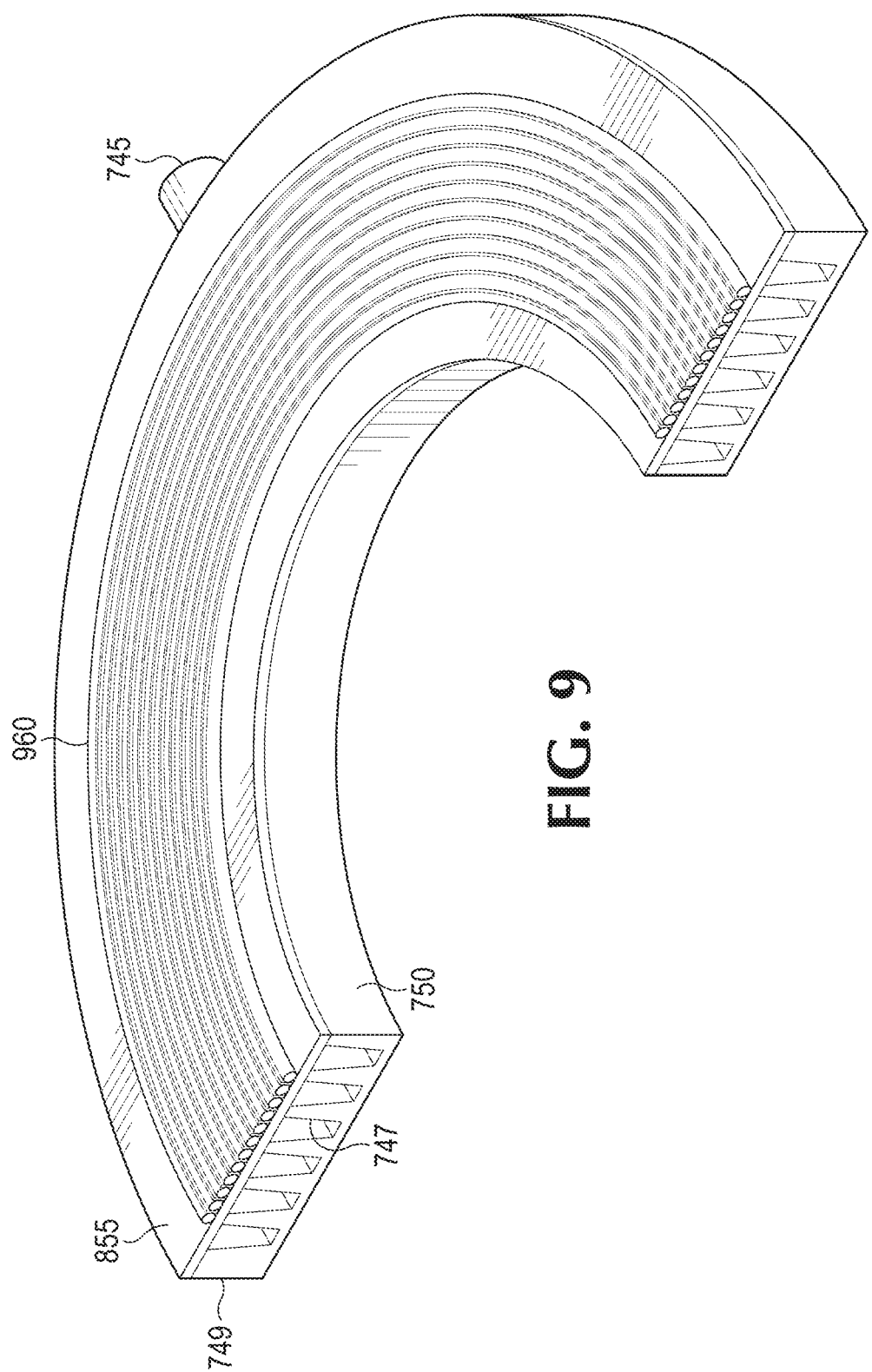

FIG. 9 diagrams a fiber laser spiral attached to the enclosing plate of the O-shaped cooling plate of FIG. 8.

Figure 10A:
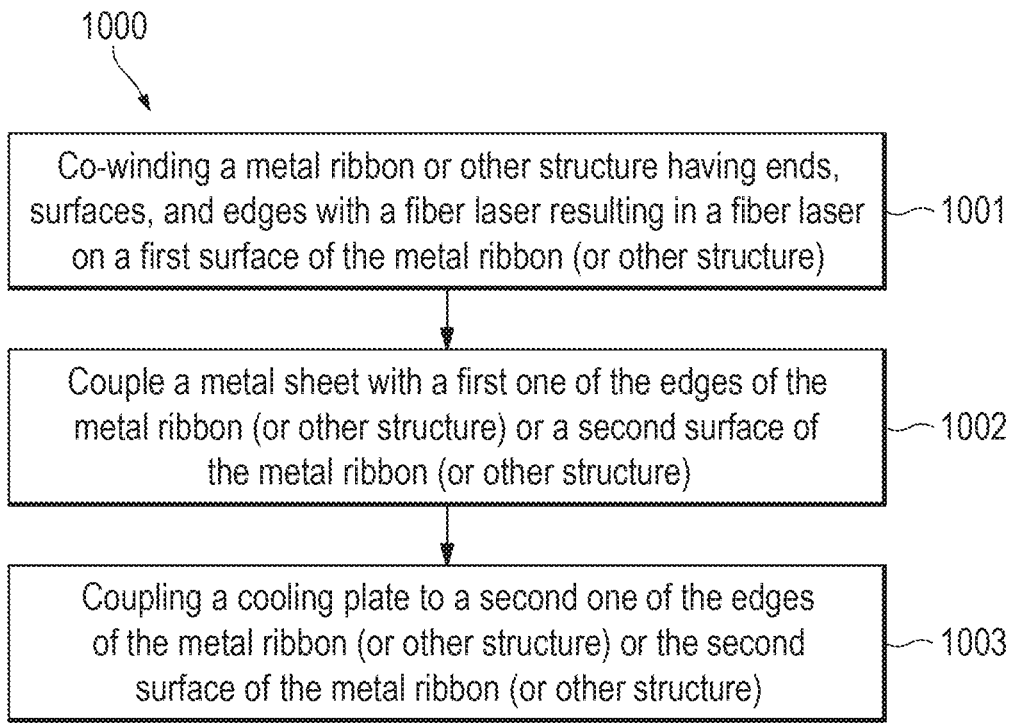
Figure 10B:
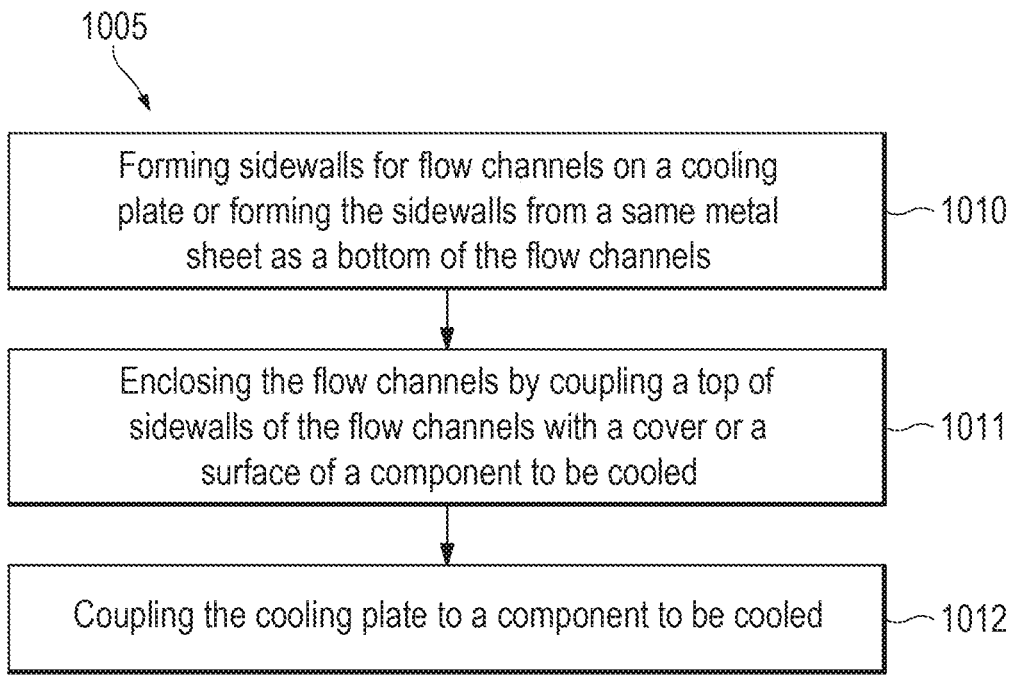

FIGS. 10A-B diagram methods for packaging a fiber laser according to various embodiments.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

The laser system described with reference to FIGS. 1 and 2 may be difficult to machine. This difficulty in machining, besides raising the expenses, may require that the cooling plate is made from a different material than the tubing 205, which may have a lower thermal conductivity (an aluminum cooling plate 200 has a lower thermal conductivity than copper tubing 205).

Even using the different material, the known machining processes may still undesirably require the grooves 36 (FIG. 1) to be larger than a theoretical minimum size needed to receive fiber laser 30. While the resulting void may be filled with a thermally conductive potting compound to prevent air from filling the void (air has a lower thermal conductivity than the thermally conductive potting compound), the thermal conductivity of the thermally conductive potting is less than the thermal conductivity of other components of the system.

What is needed is a process for constructing a spiral that limits the amount of potting material around the fiber and/or does not limit selection of packaging materials based on channel etching/machining processes of a coolant plate fabrication process. A laser system using a wound fiber laser spiral and/or a cooling plate with flow channels may be more effective at removing heat than the laser system described in FIGS. 1 and 2.

Wound Fiber Laser Spiral

In a system utilizing a wound fiber laser spiral, the pre-assembled/tested fiber laser may be co-spiraled with a ribbon (e.g., a metal ribbon, such as a copper ribbon and/or aluminum ribbon) and a thermal interface (potting) material to produce a tightly wound spiral with minimal thermal interface/potting material for best thermal performance. As the fiber and ribbon are being wound, a potting or thermal interface material (TIM) may be deposited on the ribbon and/or fiber. The potting/TIM material may fill the small interstitial voids around the fiber. In some embodiments, the wound fiber laser spiral may be mounted to a first face of a thin (~one mm) sheet (e.g., copper or aluminum). A second face of the thin sheet may include structures for coupling the assembly to a cold plate, such as a known cold plate or a cooling plate with flow channels. In other examples, the second face may not include such structures (e.g., a featureless smooth planar surface).

Previous approaches may pot the fiber directly into a machined spiral. Some machining process may require the spiral to be made from aluminum, for cost effectiveness and/or other reasons. Some machining processes may require a minimum thickness of material (e.g., no less than 0.2 inches) measured from a bottom of the inside of the groove of a first side to a second opposite side. This requirement adds to the total distance between the fiber and the cooling plate, which limits heat transfer. Also, some groove machining processes may require the groove to be a uniform width. However, the diameter of the fiber may not be uniform (the fiber may include a portion with recoated splices, which may be wider in diameter than another portion of the fiber). This may lead to a thicker layer of potting material around the fiber, and coupled with the >0.2 inches of lower thermal conductivity aluminum, may result in relatively poor thermal performance (limiting the maximum power one can achieve in the laser). The wound fiber laser spiral may 1) use less potting material for a given length of fiber, 2) may conform to the fiber and may accommodate the slightly larger diameter of the recoat without requiring additional space around the rest of the non-recoated fiber, 3) may not require the same distance between the fiber and a cooling source (e.g., a cooling plate) and may enable the material in this space to be a thin inexpensive sheet metal (e.g., a thin copper sheet), and 4) may reduce the cooling requirements (e.g. coolant flow rate) for the fiber laser. Some embodiments may utilize a different potting material (e.g., a higher thermal conductivity potting material than the laser system described with reference to FIGS. 1 and 2) given that less potting material is used (lower expense) and/or the potting material is used differently.

Cooling Plate with Flow Channels

Heat dissipated in fiber lasers may define the limit of achievable output power. Heat may be generated at splices, damaged buffer sites, and throughout the volume of the fiber in the case of the active (doped) fiber in resonators and amplifiers. The fiber materials, particularly the plastic buffer material, can only withstand certain temperatures before it fails. Some of the materials commonly used may be limited to 120° Celsius. For pump diodes, there may be a substantial performance efficiency penalty associated with elevated temperature. More effective dissipation of heat generated by fiber lasers may enable a higher output power, which may reduce cost for a given power level. Improved cooling may also enable more compact solutions for a given power level.

A cooling plate with flow channels may be formed from a thin sheet of coolant-wettable material, such as metal (e.g., copper, brass, stainless steel, or the like, or combinations thereof). In some embodiments, the thin sheet of material may be stamped to form channels to be used as a coolant path. In other embodiments, the channels can be formed using other techniques (instead of and/or in combination with stamping), such as 3D printing, drawing, or the like, or combinations therefore. A cover may be coupled to the stamped/drawn/printed sheet to enclose the channels (the cover may be a thin sheet of any coolant-wettable material). The cover may be coupled using laser welding, resistance welding, brazing, or the like, or combinations thereof such that it is substantially leak free. Coolant inlets and outlets may be attached to provide an ingress and egress, respectively, for the coolant to travel through the enclosed channels. The inlets and outlets may be brazed in tubing, o-ring face seals, etc.

The thin sheets of material used for the cooling plate with the flow channels may have a shape that corresponds to the laser component to be cooled. In contrast to the laser system described in FIGS. 1-2, where the spiral is round and the cooling plate is rectangular, a cooling plate with flow channels to cool a spiral may be O-shaped to correspond with the round spiral. In embodiments in which a cooling plate with flow channels is to be used to cool a different laser system component (e.g., pump diodes or laser diode drivers), the cooling plate with flow channels may have a different shape to correspond to such laser system component (e.g., a square, a rectangle, or the like, as needed based on the shape of the laser system component to be cooled).

A cooling plate with flow channels of any shape may be coupled to an aluminum spiral to provide greater thermal improvement being realized. The cooling plate with flow channels may be inexpensively formed from two thin sheets of copper—in contrast with the rectangular cooling plate of FIG. 2, in which the cooling plate 200 may be made from a different material (e.g., aluminum) than the tubing 205.

In a cooling plate with flow channels, the channels can be formed to have paths corresponding to a path of the fiber laser. This is in contrast to the cooling plate 200 (FIG. 2) in which the paths of the copper tubing do not correspond with the paths of the fiber laser (the coolant is displaced by more material and interfaces than what can be achieved using channels with paths to correspond to paths of the fiber laser).

In some embodiments, a fiber spiral may be coupled fiber side down to a cooling plate with flow channels (the grooved side of the fiber spiral may be in direct contact with the cooling plate with flow channels). In other embodiments, the fiber spiral may be coupled differently to the cooling plate with flow channels. A cooling plate with flow channels may be used with a wound fiber laser spiral. In the "fiber side down" coupling configuration using with the wound fiber laser spiral, the fiber laser may be in direct contact with part of the cooling plate, such as the cover (which may put the fiber laser in direct contact with a thin sheet of cooper with coolant flowing on the other side).

In some examples, an additional cover may be coupled to a back side of the cooling plate with flow channels. An additional laser component may be coupled to the additional cover to cool more than one component with the same cooling plate. In some embodiments (such as an embodiment using stamping), a space between the back side of the cooling plate and the additional cover may be used for counter flow channels so as to have coolant flowing on both sides of the cooling plate.

FIG. 3 diagrams a wound fiber laser spiral 300 according to various embodiments. The wound fiber laser spiral 300 includes a ribbon 311 (e.g., a copper ribbon) co-wound with the fiber laser 310. In some embodiments, a potting material may be placed on one or both of the laser spiral 300 or a ribbon 311 prior to wrapping.

The winding of the fiber may be accomplished using a tool having a structure arranged to guide the fiber laser 310 and ribbon 311 into a narrow slot. The slot could be between two pieces of plastic that is part of the fixture and the potting compound does not adhere to.

The ribbon 311 and fiber laser 310 may be mounted on a sheet 308 (e.g., a copper or aluminum sheet. In some embodiments, the sheet may be approximately one mm thick.

In some embodiments, a wound fiber laser spiral includes a metal ribbon (or other conductive structure, such as a flat wire) having ends, surfaces, and edges. A fiber laser may be on a first one of the surfaces of the metal ribbon. A metal sheet may be coupled to edges of the metal ribbon.

FIG. 4 diagrams another wound fiber laser spiral 400 according to various embodiments. The wound fiber laser spiral 400 includes metal plates (e.g., annular rings) 425 and 426. A tool for winding a fiber may have the metal plates 425 and 426 inserted into it to provide a narrow slot in which to form the wound fiber laser spiral 400. When the metal plates 425 and 426 are removed from the tool, the co-winding may be attached to the metal plates 425 and 426.

FIG. 5 diagrams a wound fiber laser spiral 500 with interlocking according to various embodiments. A tool for winding a fiber may shape a metal ribbon into the interlocking structure 530.

In some embodiments, a wound fiber laser spiral includes a metal ribbon (or other conductive structure, such as a flat wire) having ends, surfaces, and edges. A fiber laser may be on a first one of the surfaces of the metal ribbon. A metal sheet may be coupled to a second one of the surfaces of the metal ribbon. The edges of the metal ribbon may be in direct contact with the second surface of the metal ribbon.

FIG. 6 diagrams another wound fiber laser spiral 600 with interlocking according to various embodiments. A tool for winding a fiber may shape a metal ribbon into the overlapping interlock structure 630.

In some embodiments, a wound fiber laser spiral includes a metal ribbon (or other conductive structure, such as a flat wire) having ends, surfaces, and edges. A fiber laser may be on a first one of the surfaces of the metal ribbon. A metal sheet may be coupled to a second one of the surfaces of the metal ribbon. The first surface of the metal ribbon may be in direct contact with the second surface of the metal ribbon.

FIG. 7 diagrams an O-shaped cooling plate 700 that may be used with fiber laser components, such as any of the wound fiber laser spirals described herein. The O-shaped cooling plate 700 may be formed from a thin sheet of material. Interior walls 747 may be formed by, for example, stamping the thin sheet of material, drawing, or printing on the thin sheet of material, or the like, or combinations thereof. The interior walls 747 may be continuous except for, in some embodiments, spaces 752 to be proximate to the inlet 745 and the outlet 740.

The inner wall 750 and the outer wall 749 may be formed by the same or different process than the interior walls 747. The inlet 745 and the outlet 740 may be formed from tubing and attached to the thin sheet and/or the outer wall 749.

The thin sheet of material, the interior walls 747, the inner wall 750, and the outer wall 749 may form sidewalls of flow channels. As mentioned previously, in some embodiments a path of the flow channels may correspond to a path of the fiber laser of the wound fiber laser spiral.

FIG. 8 diagrams the O-shaped cooling plate of FIG. 7 with an enclosing plate 855. The enclosing plate 855 may be attached to top edges of the interior walls 747 (FIG. 7), the inner wall 750, and the outer wall 749, to prevent leaks. The illustrated casing includes a cover (e.g., enclosing plate 855), a bottom (not shown), and inner and outer sidewalls (749 and 750 (FIG. 7), respectively).

In some embodiments, a cooling plate may include a casing including a cover, a bottom, and an outer sidewall. Flow channels may be formed inside the casing. The flow channels may be defined by inner sidewalls of the cooling plate. The cover may be coupled with a top of the inner sidewalls to enclose the flow channel.

FIG. 9 diagrams a coiled fiber laser 960 attached to an enclosing plate of an O-shaped cooling plate similar to the O-shaped cooling plate 700 (FIGS. 7 and 8). In some embodiments, the coiled fiber laser 960 may correspond to the coiled fiber lasers of FIGS. 1A-C. In other embodiments, an O-shaped cooling plate may be coupled with any of the wound fiber laser spirals described herein.

FIGS. 10A-B diagram methods for packaging a fiber laser according to various embodiments. Referring to method 1000 of FIG. 10A, in block 1001, a metal ribbon or other structure having ends, surfaces, and edges (to conduct heat) may be co-wound with a fiber laser resulting in a fiber laser on a first surface of the metal ribbon (or other structure).

In block 1002, a metal sheet may be coupled to a first one of the edges of the metal ribbon (or other structure) or a second surface of the metal ribbon (or other structure).

In block 1003, a cooling plate may be coupled to a second one of the edges of the metal ribbon (or other structure) or the second surface of the metal ribbon (or other structure). In an example, the cooling plate may include a casing and flow channels formed inside the casing. In an example, a cover of the casing may be coupled to the metal ribbon (or other structure). In other examples it may be possible and practical for the backside of the metal sheet (e.g., a side different than the side to which the fiber laser is coupled) to serve as the cover for the cooling plate or an additional cooling plate (of the same or different type) may be coupled to the backside of the metal sheets.

Referring now to method 1005 of FIG. 10B, in block 1010, sidewalls for flow channels may be formed on a cooling plate or sidewalls may be formed from a same metal sheet as a bottom of the flow channels (e.g., stamped metal sheet embodiments). In block 1011, the flow channels may be enclosed by coupling a top of the sidewalls of the flow channels with a cover or surface (e.g., a planar surface) of a component to be cooled. In some examples, the cooling component may be a wound fiber laser spiral and the cover may be coupled to metal ribbons (or other conductive structure) of the wound fiber laser spiral.

If the cooling plate is not already coupled to the component to be cooled via block 1011, then in block 1012 the cooling plate may be coupled to the component to be cooled. The cooling plate may be coupled to pump diodes, laser diode drivers, fiber laser spirals, or the like.

In view of the many possible embodiments to which the principles of the disclosed technology may be applied, it should be recognized that the illustrated embodiments are only preferred examples and should not be taken as limiting the scope of the disclosure. I claim as my invention all that comes within the scope and spirit of the appended claims.

The invention claimed is:

1. An apparatus, comprising:
a wound fiber laser spiral, including:
a metal sheet; and
a metal ribbon co-wound with an optical fiber into a co-winding, the metal ribbon having ends, surfaces, and edges, wherein the optical fiber is in contact with a first one of the surfaces of the metal ribbon;
wherein the co-winding is mounted on the metal sheet with at least a first one of the edges of the metal ribbon or a second one of the surfaces of the metal ribbon contacting the metal sheet; and
a cooling plate coupled to a second one of the edges of the metal ribbon or the second surface of the metal ribbon, the cooling plate including:
a cover to enclose flow channels formed inside the cooling plate, wherein the cover is coupled to a top of sidewalls of the flow channels; and
an inlet to deliver coolant to the flow channels.

2. The apparatus of claim 1, further comprising a potting compound between the optical fiber and the first surface of the metal ribbon.

3. The apparatus of claim 1, wherein the metal sheet has a same thermal conductivity as the metal ribbon.

4. The apparatus of claim 1, wherein the surfaces of the metal ribbon are planar.

5. The apparatus of claim 1, wherein the surfaces of the metal ribbon are curved.

6. The apparatus of claim 1, wherein the first surface of the metal ribbon defines an enclosure for the optical fiber.

7. The apparatus of claim 6, wherein the edges of the metal ribbon are in direct contact with the second surface of the metal ribbon.

8. The apparatus of claim 6, wherein the first surface of the metal ribbon is in direct contact with the second surface of the metal ribbon.

9. The apparatus of claim 1, wherein the cooling plate further comprises an outlet for coolant discharge.

10. The apparatus of claim 1, wherein the sidewalls of the flow channels are formed from a same metal sheet as a bottom of the flow channels.

11. The apparatus of claim 1, wherein the sidewalls of the flow channels are formed on a metal sheet that defines a bottom of the flow channels.

12. The apparatus of claim 1, wherein the sidewalls are non-continuous adjacent to the inlet.

13. The apparatus of claim 1, wherein a thermal conductivity of the cover is the same as a thermal conductivity of the metal ribbon.

14. An apparatus, comprising:
a metal sheet;
a flat wire co-wound with an optical fiber into a co-winding, wherein the flat wire includes ends, surfaces, and edges and in the co-winding a first one of the surfaces of the flat wire is in direct contact with a portion of the optical fiber; and
the co-winding mounted on the metal sheet with at least a first one of the edges of the flat wire or a second one of the surfaces of the flat wire contacting the metal sheet.

15. The apparatus of claim 14, wherein the metal sheet is less than 0.2 inches thick.

16. The apparatus of claim 14, wherein a conductivity of the metal sheet is the same as a conductivity of the flat wire.

17. Fiber laser packaging, comprising:
a metal sheet; and
a metal ribbon co-wound with an optical fiber into a co-winding, the metal ribbon having ends, surfaces, and edges, wherein the optical fiber is in contact with a first one of the surfaces of the metal ribbon;
wherein the co-winding is mounted on the metal sheet with at least one of the edges of the metal ribbon or a second one of the surfaces of the metal ribbon contacting the metal sheet.

18. The fiber laser packaging of claim 17, wherein the one of the edges of the metal ribbon comprises a first one of the edges of the metal ribbon, and the fiber laser packaging further comprises:
a cooling plate coupled to a second one of the edges of the metal ribbon or the second surface of the metal ribbon, the cooling plate including:
a cover to enclose flow channels formed inside the cooling plate, wherein the cover is coupled to a top of sidewalls of the flow channels; and
an inlet to deliver coolant to the flow channels.

19. The fiber laser packaging of claim 17, further comprising a potting compound between the optical fiber and the first surface of the metal ribbon.

20. The fiber laser packaging of claim 17, wherein the surfaces of the metal ribbon are planar.

21. The fiber laser packaging of claim 17, wherein the metal ribbon comprises a copper ribbon.

* * * * *